Figure 1:
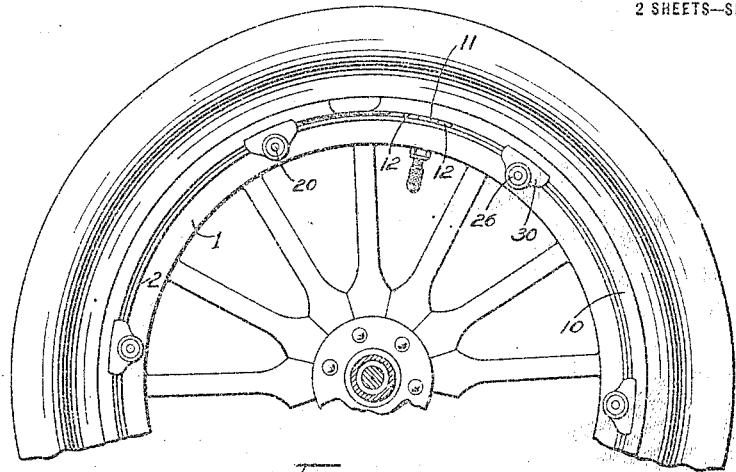

R. S. BRYANT.
RIM FOR VEHICLE WHEELS.
APPLICATION FILED MAY 27, 1912.

1,224,706.

Patented May 1, 1917.
2 SHEETS—SHEET 1.

Witnesses:

Inventor
Richard S. Bryant
By Hull & Smith
Attys.

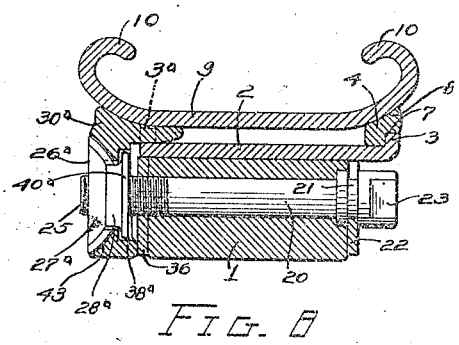
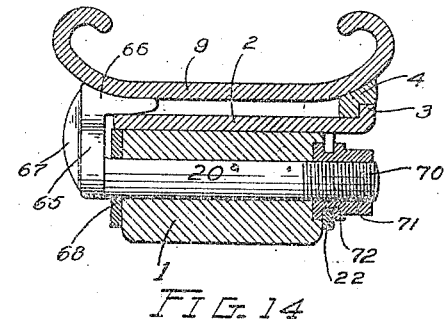
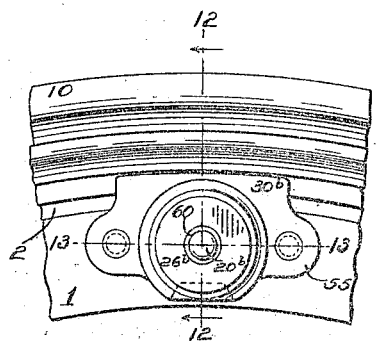
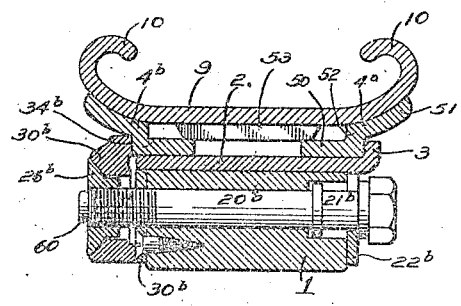
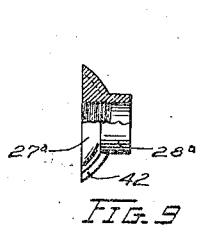
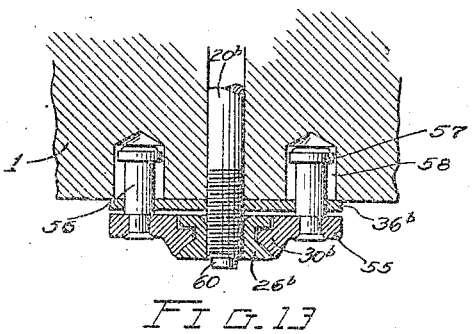
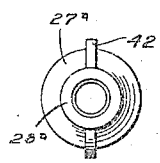

UNITED STATES PATENT OFFICE.

RICHARD S. BRYANT, OF CLEVELAND, OHIO, ASSIGNOR TO THE STANDARD WELDING COMPANY, OF CLEVELAND, OHIO, A CORPORATION OF OHIO.

RIM FOR VEHICLE-WHEELS.

1,224,706. Specification of Letters Patent. Patented May 1, 1917.

Application filed May 27, 1912. Serial No. 699,928.

*To all whom it may concern:*

Be it known that I, RICHARD S. BRYANT, a citizen of the United States, residing at Cleveland, in the county of Cuyahoga and State of Ohio, have invented a certain new and useful improvement in Rims for Vehicle-Wheels, of which the following is a full, clear, and exact description, reference being had to the accompanying drawings.

This invention relates to vehicle wheels and has for its general object the provision of new and improved expedients whereby a tire-carrying rim can be firmly and conveniently secured about a felly. The purpose of such construction as is well known, is to permit an extra rim provided with a fully inflated pneumatic tire to be carried upon an automobile so that in case of tire troubles this new rim and its tire can be expeditiously and conveniently substituted for the one originally upon the wheel. A great number of different expedients have been proposed for accomplishing this purpose, but they have been unsatisfactory for various reasons, either because of a deficiency in strength or of ponderous and unsightly construction, or because of the difficulty of manufacturing or because of unreliability of operation due to deformation or localized wear. A further disadvantage of many previously employed devices has been that in dismounting the rim it has been necessary to remove entirely a considerable number of small and easily misplaced parts which were easily lost particularly when the repairing had to be done in a muddy road or at night. Another disadvantage of some rims has been the complexity of their construction which has rendered it impossible for any person to manipulate the devices unless after a large amount of instruction thus rendering many drivers absolutely dependent upon garage men and mechanics for operations which they should be able to do for themselves.

The objects of this invention are, therefore, the provision of means of great simplicity and reliability for securing a demountable rim upon its felly; the provision of a device of this character that can be easily manufactured and assembled so as to be practicable commercially for the cheaper and lighter cars; the provision of a device which can be manipulated by an unskilled person and in which no small parts need be disconnected or removed so as to become mislaid or lost; the provision of a device of this nature wherein the main clamping parts shall be disposed upon the rear or inner side of the wheel so as to be concealed from view; the provision of a device of this character wherein the rim shall embrace the felly closely instead of being spaced therefrom by a large number of cumbersome wedges, rings, blocks, bolts and other devices; the provision of a securing expedient which does not depend upon any peculiar construction of the rim; the provision of a construction wherein the outer face or side of the wheel shall be as free as possible from projections and obstructions; while further objects and advantages of my construction will become apparent from the following description and claims.

Figure 2:
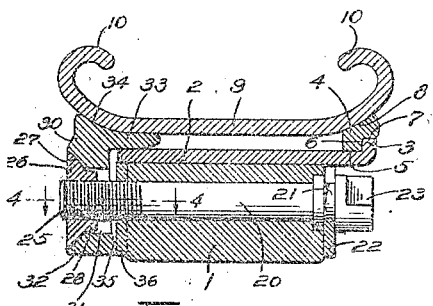
Figure 3:
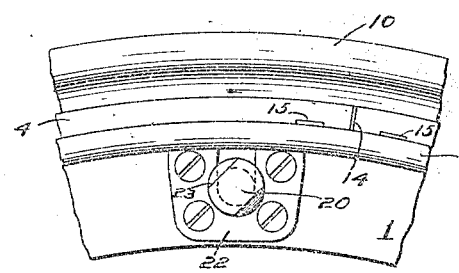
Figure 4:
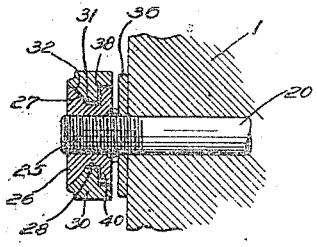
Figure 5:
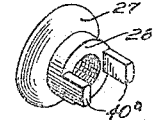
Figure 6:
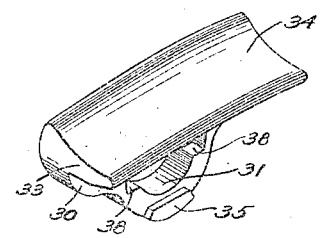
Figure 7:

Generally speaking my invention may be defined as consisting of the combinations of elements recited in the claims hereto annexed and illustrated in the drawings accompanying and forming a part hereof, wherein: Figure 1 represents in elevation a part of the inner or rearward side of an automobile wheel equipped with a demountable rim of my invention; Fig. 2 is a transverse cross-sectional view taken through one of the securing clamps; Fig. 3 represents in side elevation a portion of the front or forward side of the wheel; Fig. 4 is a detail cross-sectional view taken upon the broken line 4—4 of Fig. 2; Fig. 5 is a perspective view of the nut prior to its attachment to the wedge clip; Fig. 6 is a perspective view of the wedge clip prior to the attachment of the nut thereto; Fig. 7 is a face view of the felly plate interposed beneath the wedge clip; Fig. 8 is a cross sectional view through a rim and felly, similar in general to that illustrated in Fig. 2 but disclosing a modified form of nut; Figs. 9 and 10 are detail views of the modified nut; Fig. 11 is an elevation of a portion of the rear or inner side of a wheel provided with a modified form of wedge member and clip; Fig. 12 is a transverse cross sectional view taken upon the line 12—12 of Fig. 11 and looking in the direction of the arrows; and Fig. 13 is a detail cross sectional view taken upon the line 13—13 of Fig. 11 and showing the means for limiting the movement of the clip and for preventing rotation thereof, and Fig. 14 illustrates a further modification.

Describing the parts by reference characters, 1 represents the felly of an automobile wheel about which is secured the annular felly band 2, said felly band having its inner edge substantially plain, and having its forward edge overhanging the felly by a considerable amount and formed with an outwardly projecting lip or flange 3. Such band, along with the felly, constitutes, to all intents and purposes, an integral part of the wheel body or wheel proper, and for the present description as well as the following claims the latter terms may be understood to refer to the unitary structure, whatever its component parts or detailed form. It is obvious that the position of this felly band relative to the felly could be varied through wide limits without affecting the operation of my invention, but the construction described is preferred for reasons that will be pointed out hereafter. It is essential, however, to the invention that a flange 3 or its equivalent be formed at the forward side of the felly band, while the rearward side thereof may in some cases be formed with an interrupted flange 3ª as shown in dotted lines in Fig. 8 or be left plain as illustrated in the remaining views. Surrounding this felly band is an elastic split ring 4 having a cylindrical interior surface 5 adapted to engage the flat face of the felly band and also having an outwardly facing shoulder 6 adapted to engage the inner face of the flange 3. In Figs. 2 and 8 I have illustrated this ring as also formed with an inwardly facing surface 7 adapted to engage the edge of the flange 3, although this feature is not essential to the performance of my invention. The exterior surface of this ring is always sloped inwardly as shown at 8 to correspond to the shape of the rim which is to be secured to the wheel.

In these drawings I have illustrated a rim 9 of the clencher type having inwardly-turned tire-engaging flanges 10—10 although it will be obvious that rims of other cross-sections could be employed without departing from my invention in case the surface of the ring 7 be properly shaped to coöperate therewith. Likewise, while I have illustrated herein a collapsible rim constructed in accordance with my copending application filed April 25, 1912, Ser. No. 693,077, I have done so solely for purposes of illustration as it is obvious that the present invention is totally independent of the particular kind of rim employed and that either a solid continuous ring could be used or that the rim could include any desired means for facilitating the removal of the tire. In any case it is desirable that driving lugs should be employed to prevent shearing of the valve stem, and accordingly I have illustrated in Fig. 1 a block 11 carried by the rim and interposed between blocks 12—12 carried by the felly band. The ring 4 is preferably formed to spring closely about the felly band and the length thereof is such as to bring its abutting ends close together as shown at 14 in Fig. 3, said ends being either squared or overlapped as convenience may indicate. Each end of the ring is preferably provided with a notch 15 as shown in Fig. 3 to permit the reception of a screw driver or like prying tool between it and the flange 3.

Formed through the felly are a plurality of equidistantly spaced transverse apertures in which are received rotatable bolts 20, the head ends whereof are formed with annular grooves 21 receiving slotted plates 22 which are secured to the front face of the felly. The portion of the bolt head projecting beyond this plate is squared or otherwise formed as at 23 for the reception of a socket wrench or like tool and preferably extends a less distance from the felly than the overhanging edge of the felly band or rim so as to be protected from contact with obstructions. In the present embodiment I have illustrated six such bolts, the same being so arranged with respect to the valve stem as to avoid the spoke tenons when used either with a ten-spoke or twelve-spoke wheel, although the number and arrangement of these bolts and their associated parts may be varied widely without departing from the scope of my invention.

The inner end of each bolt is threaded as at 25 for the reception of a nut 26, said nut being formed preferably with a convex shoulder 27 on the side adjacent to the rim and with a cylindrical axial sleeve 28 projecting inwardly from the center of said shoulder. Surrounding the inner end of the bolt is a clip 30, said clip being formed with an aperture 31 receiving the bolt 20 and sleeve 28 and the outer end of said aperture merging with a concave recess 32 receiving the shoulder 27. In the embodiment illustrated in Figs. 1 to 8 inclusive this clip is formed at one side of the aperture with a wedge portion 33 adapted to fit between the felly band and rim, the outer surface of said wedge portion being curved or beveled as at 34 to engage the side of the rim opposite to the ring 4. This wedge portion is preferably extended from side to side for a considerable distance, both for the purpose of forming an extended bearing for the rim and of preventing the rotation of the clip by the friction of the bolt. At the opposite side of the aperture 31 from this wedge portion the clip is formed with a heel 35 adapted to rest against a wear plate 36 carried by the felly and thus define a pivot about which the clip may rock. In the embodiment illustrated in Figs. 2 and 8, the felly band is arranged to partially overhang this plate, although this is a matter of design only. Like the felly band, these plates obviously constitute, in effect, integral parts of the wheel structure and need not be separately mentioned in any general reference to such wheel.

Adjacent to the sides of the aperture 31 the inner face of the clip is formed with recesses 38—38 in which are disposed the outwardly turned integral ears 40 formed on the nut 26, by means of which the separation of the nut from the clip is obviated and its rotation relative thereto prevented, but without preventing their relative universal movement about the surfaces 27 and 32. These ears are originally formed as forwardly projecting parallel arms as shown at 40ª in Fig. 5, being afterward bent laterally outward as illustrated in Fig. 4, and the recesses 38—38 are formed upon a line parallel to the general direction of the wedge portion 33 in order that the rocking movement of the clip about the heel 35 may not be impaired.

The operation of the device illustrated in Figs. 1 to 7 of the drawings is as follows: Assuming the parts to be in the position shown in Fig. 2, and that it be desired to remove the rim, the bolts 20 are first rotated to the left so as to force the wedges 33 from between the rim and felly band, longitudinal motion of the bolts being prevented by the plates 22. As soon as this has been done, the rim 9 will be freed sufficiently to permit it to be pushed away from the flange 3, whereupon the ring 4 can be progressively pried from off the felly band, after which the rim 9 can easily be removed. It will be found that only a small amount of movement of the wedges 33 is necessary to permit the removal of the ring 4, owing to the fact that as soon as the rim 9 is released, it can be canted to one side so as to permit the ring 4 to be released for a portion of its length, and after this portion of the ring has been sprung over the edge of the flange 3 the rim can be canted in another direction so as to permit a succeeding portion of the ring to be removed. The replacement of the ring involves merely the reverse of these operations and is thought to need no explanation. It is apparent that all these operations can be effected without the necessity for disconnecting or removing any of the parts excepting the ring 4 which from its size is scarcely liable to be lost or misplaced.

The construction illustrated in Figs. 8 to 10 inclusive is exactly like that illustrated in Figs. 1 to 7 excepting as to the formation of the rear side of the felly band with a discontinuous flange 3ª (shown in dotted line), and the provision of a different expedient for securing the nut to the bolt. In this embodiment the nut 26ª is formed as before with a spherical shoulder 27ª and with a forwardly projecting axial sleeve 28ª, and the clip 30ª is apertured as before for the reception of the bolt and nut sleeve. The outer end of this aperture merges with a concave recess receiving the spherical shoulder of the nut, but the inner end of this aperture is formed with a complete annular recess 38ª instead of the separate recesses 38—38, and the end of the sleeve 28ª is upset or turned outwardly as at 40ª to form a lip fitting in this recess. Rotation of this nut is prevented by forming upon its spherical surface a pair of diametrically opposite curved ribs 42 which are received in complementary grooves 43 formed in the recessed portion of the clip. In the embodiment illustrated in Fig. 8, these ribs and grooves are disposed upon a line substantially perpendicular to the direction of the engaging portion of the clip, although this arrangement could doubtless be varied without materially affecting the operation of the device.

In Figs. 11 to 13 inclusive I have illustrated a third embodiment of my invention, wherein the ring 4 is replaced by a ring 4ª rolled out of sheet metal and comprising a cylindrical portion 50 embracing the felly band, a flaring portion 51 engaging the rim and a radial portion 52 connecting the same and resting against the flange 3. At the opposite side of the felly band, a second ring 4ᵇ exactly like the first ring is employed, both of said rings being split as before and formed to embrace closely the face of the felly band. If desired, spaced blocks 53 may be secured to the inner surface of the rim so as to overhang the inner edges of the portion 50 of the rings and prevent said rings from being keeled up or overturned, although I apprehend that this expedient will seldom be found necessary. For the purpose of drawing the rearward ring toward the forward ring I employ a clip 30ᵇ interlocked with a nut and operated as before, the sole essential difference between this clip and the former clip being in its formation with an abutment surface 34ᵇ adapted to engage the radial side of the ring 4ᵇ instead of with a wedge portion adapted to engage the rim directly. In this embodiment I have illustrated a nut 26ᵇ exactly like the nut 26 and secured to the clip in the same manner as that illustrated in Figs. 1 to 7 inclusive, but have provided certain other features which may if desired be employed for preventing the rotation or disconnection of the clip while still rendering the device perfectly fool-proof. In this embodiment the bolt is illustrated at 20ᵇ and is as before formed with an annular groove 21ᵇ receiving a slotted plate 22ᵇ, but this groove is, in this case, made of much greater width than the plate so as to permit a considerable amount of longitudinal movement to the bolt, the felly within the plate being suitably recessed as shown. The clip 30ᵇ and wear plate 36ᵇ are formed with apertured ears 55 and to the clip are secured rigid studs 56 which project through the apertures in the ears of the wear plate and are provided at their inner ends with heads 57 whereby their withdrawal from the wear plate is prevented. The felly is recessed to receive these studs as shown at 58 and the plate 36ᵇ is rigidly secured to the felly as by screws so that the amount of movement of the clip 30ᵇ is definitely limited. The length of the bolt 20ᵇ is so adjusted that before the heads 57 of the studs 56 and the inner flange of the bolt head shall have reached their respective felly-plates, the threads of the bolt will have terminated, so that an ignorant or unobserving operator cannot by rotating the bolt an unnecessary amount force either of these plates away from the felly. The end of the bolt is, however, provided with an unthreaded extension or pilot 60 so that if this condition be reached the nut can easily be picked up again. The wide groove 21ᵇ can be used in connection with the clip 30ᵇ and ring 4ᵇ better than with the clip 30 or 30ᵃ, owing to the fact that in the latter case it is necessary to withdraw the wedge portion 33 forcibly from between the rim and felly band, whereas the clip 30ᵇ merely presses against the face of the ring and can be removed therefrom without opposition.

In Fig. 14, I have shown a fourth embodiment of my invention, the main point of distinction between this embodiment and the previously described device being that in this instance the bolt is reciprocably but nonrotatably mounted in the felly and has its rearward end secured directly in some manner to the wedge means, a suitable nut being threaded upon the forward end of the bolt swiveled to the felly. In this device the parts 1 to 19 inclusive are exactly the same as those before described, but the bolt 20ᵃ has secured to its rearward end a wedging member having a laterally projecting branch 65 provided at its end with a wedge portion 66 adapted to be interposed between the felly band and rim. These parts are preferably stiffened by means of one or more ribs or fins 67, and the washer 68 is secured to the side of the felly at the rear end of the bolt in order to prevent the felly from being worn. This washer may also be employed as a jig to fix the position of the bolt receiving the aperture with respect to the felly band. The forward end of the bolt is threaded as at 70 for the reception of a nut 71, said nut being provided with a circumferential groove 72 which coöperates with the felly plate 22 to hold the nut against longitudinal movement.

Obviously the particular construction of the wheel is not important so far as concerns the devices herein disclosed and claimed. I have shown a standard type of wheel comprising a felly and a felly band, though it will be understood that either of these devices could be omitted or both combined together without affecting the operation of the rim and clip. To bring out this idea more clearly I have in certain of my claims employed the term "circular member."

It is obvious, further, that all manner of re-arrangements of the elements and features illustrated in these views could be made without departing from the main inventive idea which runs through all of them, and could likewise be used in connection with other expedients known to the prior art. While I have necessarily described my invention in detail, I do not, therefore, propose to limit myself to such details except as they may be positively recited in the claims hereto annexed or may be rendered necessary by the prior state of the art.

Having thus described my invention, what I claim is:

1. In a vehicle wheel, the combination with a felly and a tire-supporting rim; of detachable means at the forward edge of said felly adapted to prevent removal of said rim, said means being locked in place by said rim when properly seated; and means adapted to prevent lateral movement of said rim in a rearward direction with reference to said felly, said last-named means including a wedging member transversely adjustable of said felly and adapted in one position to permit sufficient movement of said rim to unlock said detachable means.

2. In a vehicle wheel, the combination with a felly and a tire-supporting rim; of detachable means at the forward edge of said felly adapted to prevent removal of said rim, said means being locked in place by said rim when properly seated; and means adapted to prevent lateral movement of said rim in a rearward direction with reference to said felly, said last-named means including a wedging member transversely adjustable of said felly and adapted in one position to permit sufficient movement of said rim to unlock said detachable means, and means operable from the forward side of said felly adapted thus to adjust said wedging member.

3. In a vehicle wheel, the combination with a felly and a tire-supporting rim; of detachable means at the forward edge of said felly adapted to prevent removal of said rim, said means being locked in place by said rim when properly seated; and means adapted to prevent lateral movement of said rim in a rearward direction with reference to said felly, said last-named means including a wedging member transversely adjustable of said felly and adapted in one position to permit sufficient movement of said rim to unlock said detachable means, and a rotatable member projecting from the forward side of said felly and having threaded engagement with said wedging member thus to adjust the same.

4. In a vehicle wheel, the combination with a felly and a tire-supporting rim; of detachable means at the forward edge of said felly adapted to prevent removal of said rim, said means being locked in place by said rim when properly seated; and means adapted to prevent lateral movement of said rim in a rearward direction with reference to said felly, said last-named means including a wedging member transversely adjustable of said felly and adapted in one position to permit sufficient movement of said rim to unlock said detachable means, and a transversely disposed bolt rotatably but non-longitudinally movable in said felly and having threaded engagement with said wedging member thus to adjust the same.

5. In a vehicle wheel, the combination, with a felly band having a fixed abutment at one edge, of a discontinuous ring surrounding said felly band and resting against said abutment, the outer portion of said ring being inwardly inclined, a demountable rim surrounding said felly band and having one of its sides seated on said ring, said rim being adapted to slip over said abutment upon removal of said ring, a wedging member introduced between said rim and felly band at the side opposite said abutment, said member having its outer side shaped to engage the portion of said rim opposite to said ring, and means for retaining said wedging member in place.

6. In a vehicle wheel, the combination, with a felly band, of a discontinuous elastic ring surrounding said felly band adjacent to one of its edges, the outer portion of said ring being inwardly inclined and the inner portion thereof being adapted detachably to interlock with said felly band, a demountable rim surrounding said felly band and having one of its sides seated on said ring, a wedging member introduced between said rim and felly band at the side opposite said ring, and means for retaining said wedging member in place.

7. In a vehicle wheel, the combination, with a felly band and a demountable rim surrounding the same, said felly band having at its forward side an outwardly projecting abutment, of a discontinuous elastic ring surrounding said felly band and resting against said abutment, the outer portion of said ring being shaped to conform to the adjacent portion of said rim, and means engaging the rearward side of said rim for drawing the same forwardly against said ring, said means being operable from the forward side of the wheel.

8. In a vehicle wheel, the combination, with a felly band and a demountable rim surrounding the same, said felly band having at its forward side a radially projecting annular flange, of an elastic ring surrounding said felly band and resting against said flange, the outer portion of said ring being shaped to conform to the adjacent portion of said rim, wedge means engaging the rearward side of said felly band and rim for drawing the same forwardly upon said ring, and bolts operatively connected to said wedge means and projecting to the forward side of the wheel, whereby said wedge means may be operated.

9. In a vehicle wheel, the combination, with a felly band and a demountable rim surrounding the same, of an elastic ring interposed between one edge of the felly band and the adjacent portion of the rim and detachably interlocked with said felly band, the outer face of said ring being shaped to conform to the adjacent portion of the rim, wedge means interposed between said rim and felly band at the side opposite said ring, bolts secured transversely of said felly band, and connections between said bolts and said wedge means, said bolts being arranged to be operated from the same side of said felly band as said ring.

10. In a vehicle wheel, the combination with a circular member, of a discontinuous ring surrounding said circular member adjacent to one edge thereof, the outer portion of said ring being inwardly beveled or inclined for the reception of the inclined lateral portion of a demountable rim, said circular member and ring being formed with mutually engaging portions adapted to coöperate to secure said ring against lateral movement when the latter is engaged by the rim, and to permit removal of said ring when disengaged by said rim, the latter being adapted thereupon to slip off of said circular member, and means for engaging the opposite side of said rim for forcing the same into engagement with said ring.

11. In a vehicle wheel, the combination with a circular member, of an elastic ring surrounding said circular member adjacent to one edge thereof, the outer portion of said ring being inwardly beveled or inclined for the reception of the inclined lateral portion of a demountable rim, said circular member and ring being formed with mutually engaging portions adapted to coöperate to secure said ring against lateral movement when the latter is engaged by the rim, and to permit removal of said ring when disengaged by said rim, the latter being adapted thereupon to slip off of said circular member, and means operable from the same side of the circular member as said ring for engaging the opposite side of said rim for forcing the same into engagement with said ring.

12. In a vehicle wheel, the combination, with a felly band and a demountable rim surrounding the same, of an elastic ring surrounding said felly band adjacent to its forward edge, the outer portion of said ring being inwardly beveled or inclined for the reception of the similarly inclined lateral portion of a demountable rim, said felly band and ring being formed with mutually engaging portions adapted to coöperate to secure said ring against lateral movement when the latter is engaged by the rim, and to permit removal of said ring when disengaged by said rim, the latter being adapted thereupon to slip off of said circular member, wedging means interposed between the opposite side of said rim and felly band, bolts traversing said felly and operatively connected to said wedging means and means for operating said bolts from the side of said felly adjacent to said ring for drawing said wedging means into engagement with said rim.

13. In a vehicle wheel, the combination, with a felly and a felly band surrounding the same, of an elastic ring surrounding said felly band adjacent to one of its edges, the outer portion of said ring being inwardly beveled or inclined for the reception of the similarly inclined lateral portion of a demountable rim, said felly band and ring being formed with mutually engaging portions adapted to coöperate to secure said ring against lateral movement when the latter is engaged by the rim, bolts traversing said felly, means for operating said bolts from the side of said felly adjacent to said ring, clips surrounding the opposite ends of said bolts and having wheel engaging portions at one side, wedge means at the other ends of said clips from said wheel engaging portions and adapted to be inserted between said rim and felly band at the side opposite to said ring, and universal connections between said bolts and clips.

14. In a vehicle wheel, the combination, with a circular member and a demountable rim surrounding the same, of an elastic ring surrounding said circular member adjacent to its forward edge, said ring having its outer portion shaped to conform to the adjacent portion of said rim, and said circular member and ring being formed with mutually engaging portions adapted to coöperate to secure said ring against lateral movement when the latter is engaged by the rim, bolts traversing said circular member and having shouldered members at their inner ends, clips interposed between said shouldered members and the rear side of said circular member, wedge means interposed between said circular member and rim at the rearward edge thereof, said wedge means being operatively associated with said clips, and means for operating said bolts from the side of said circular member adjacent to said ring for forcing said wedging means in the direction of said ring.

15. In a vehicle wheel, the combination with a circular member and a demountable rim surrounding the same, of a discontinuous wedge member detachably interlocked with said circular member adjacent to its forward edge and having its outer portion shaped to conform to the adjacent portion of said rim, bolts traversing said circular member and having convex shouldered members at their inner ends, clips interposed between said shouldered members and the rear side of said circular member, wedge means interposed between said circular member and rim at the rearward edge thereof and operatively associated with said clips, and means for operating said bolts from the side of said circular member adjacent to said discontinuous member for forcing said wedging means into engagement with said rim.

16. In a vehicle wheel, the combination with a circular member and a demountable rim surrounding the same, of an elastic ring surrounding said circular member adjacent to its forward edge, said ring having its outer portion shaped to conform to the adjacent portion of said rim and said circular member and ring being formed with mutually engaging portions adapted to coöperate to secure said ring against lateral movement when the latter is engaged by the rim, rotatable bolts traversing said circular member and having threaded inner ends, the ends of said bolts adjacent to said ring being formed with tool-engaging heads, wedge means interposed between the rearward edge of said circular member and the adjacent portion of said rim, and non-rotatable threaded means engaging said wedge means and the threaded portions of said bolts whereby said wedge means may be drawn toward said ring.

17. In a vehicle wheel, the combination with a felly having a felly band and a demountable rim surrounding the same, of an elastic ring surrounding said felly band adjacent to its forward edge, said ring having its outer portion shaped to conform to the adjacent portion of said rim and said felly band and ring being formed with mutually engaging portions adapted to coöperate to secure said ring against lateral movement when the latter is engaged by the rim, rotatable bolts traversing said felly and having threaded inner ends, the ends of said bolts adjacent to said ring being formed with tool-engaging heads, nuts threaded upon said bolts, clips universally but non-rotatably engaged by said nuts, and rim engaging means associated with said clips whereby upon the rotation of said bolts said rim may be drawn upon said ring.

18. In a vehicle wheel, the combination with a felly and a felly band and a demountable rim surrounding said felly band, of an elastic ring surrounding said felly band adjacent to its forward edge, said ring having its outer portion shaped to conform to the adjacent portion of said rim, and said felly band and ring being formed with mutually engaging portions adapted to coöperate to secure said ring against lateral movement when the latter is engaged by the rim, apertured thrust plates secured to the side of said felly adjacent to said ring, annularly grooved rotatable members interlocked with said thrust plates, threaded bolts traversing said felly and connected to said rotatable members, wedge means interposed between the rearward edge of said felly band and the portion of the rim adjacent thereto, and abutment members secured to the ends of said bolts opposite to said rotatable members and engaging said wedge means whereby the rotation of said rotatable members will draw said wedge means toward said ring.

19. In a vehicle wheel, the combination with a felly and a felly band and a demountable rim surrounding said felly band, of wedge means detachably secured to said felly band adjacent to its forward edge and having a portion shaped to conform to the adjacent portion of said rim, rotatable bolts traversing said felly and having threaded inner ends, means for preventing longitudinal movement of said bolts, non-rotatable nuts threaded upon said bolts, wedge members adapted to be inserted between said rim and felly band at the side opposite to said wedge means, and means for rotating said bolts from the forward side of the felly whereby said wedge members may be drawn into and out of engagement with said rim.

20. In a vehicle wheel, the combination with a felly and a felly band and a demountable rim surrounding said felly band, of a plurality of rotatable bolts traversing said felly, said bolts having heads at the forward face of said felly and having their opposite ends threaded, non-rotatable clips at the inner side of said wheel and having portions engaging the face of the wheel, non-rotatable nuts threaded upon said bolts and having convex shoulders engaging said clips, wedge means formed with said clips and adapted to be drawn between said rim and felly by the rotation of said bolts in one direction, means securing said nuts and clips against separation whereby said wedge means will be withdrawn from said rim upon the rotation of said bolts in the opposite direction, means for limiting the longitudinal movement of said bolts, and removable abutment means interposed between said rim and the forward edge of said felly band, said abutment means and felly band being formed with coöperating interlocking portions whereby said abutment means is secured against lateral displacement by the forward movement of said rim.

21. In a vehicle wheel, the combination, with a circular member having at one edge a detachable rim engaging device, and a demountable rim surrounding said circular member and having a lateral portion thereof engaging said device, said rim being adapted when seated to lock said device in place, of a rotatable bolt traversing said circular member, a wedging member introduced between said rim and circular member at the side opposite said device, a nut threaded on said bolt and engaging said wedging member, and means for preventing relative rotation between said nut and said wedging member whereby said wedging member will be shifted transversely of said circular member upon the rotation of said bolt.

22. In a device of the character described, the combination, with a circular member and a laterally movable demountable rim adapted to surround the same, of a rotatable threaded member mounted in said circular member and having the axis of its threaded portion substantially normal to the plane of said circular member, a second threaded member screwed upon said first threaded member and having a rounded inwardly facing shoulder, a clip surrounding said second threaded member and having a concave socket receiving said rounded shoulder, said clip also having at one side a rim retaining projection, and means for preventing relative rotation of said second threaded member and said clip.

23. In a device of the character described, the combination, with a circular member and a laterally movable demountable annular member adapted to surround the same, of a rotatable threaded bolt traversing said circular member, means for restricting the longitudinal movement of said bolt, a nut threaded upon said bolt, a clip universally secured to said nut and having a projection adapted to engage said annular member, and means for preventing relative rotation between said nut and clip.

24. In a device of the character described, the combination, with a circular member and a laterally movable demountable annular member adapted to surround the same, of a rotatable threaded bolt traversing said circular member, means for restricting the longitudinal movement of said bolt, a nut threaded upon said bolt, a clip pivoted to said nut upon an axis substantially transverse to that of the bolt and having a projection adapted to engage said annular member, means for preventing relative rotation between said nut and clip, means for preventing the rotation of said clip, and means for limiting the movement of said clip away from said circular member.

25. In a device of the character described, the combination, with a circular member and a laterally movable demountable annular member adapted to surround the same, of a rotatable threaded bolt traversing said circular member, means for restricting the longitudinal movement of said bolt, a nut threaded upon said bolt, a clip pivotally secured to said nut and having a projection adapted to engage said annular member, means for preventing relative rotation between said nut and clip, and means for limiting the movement of said clip away from said circular member, the extent of the threaded portion of the bolt being such as to cause said nut to become disengaged therefrom prior to the maximum displacement of said clip.

26. A device for securing a removable member upon a circular member, comprising, in combination, a rotatable member secured transversely of said circular member, a second member swiveled upon said first member and having a rounded inwardly facing shoulder, a clip surrounding said last members and having a rounded socket receiving said shoulder, said clip also having a projecting portion adapted to engage said removable member, means for preventing relative rotation between said clip and second member, a plate secured to the side of said circular member beneath said clip, and a heel formed on said clip at a point opposite to said projecting portion and adapted to engage said plate.

27. In a device of the character described, the combination, with a circular member and a laterally movable demountable annular member adapted to surround the same, of a rotatable bolt mounted transversely of said circular member and having its threaded end projecting beyond the face of said circular member adjacent to said annular member, a nut for said bolt and having an axial sleeve projecting from its inner face, a clip having an aperture receiving said sleeve and having a projecting portion adapted to engage said annular member, said sleeve and clip being non-rotatably interlocked, means for rotating said bolt, and means for limiting the longitudinal movement of said bolt.

28. In a device of the character described, the combination with a circular member and a demountable annular member surrounding the same, of a rotatable bolt mounted transversely of said circular member, a non-rotatable clip surrounding said bolt and having a portion engaging said annular member, a nut threaded upon said bolt and non-rotatably secured to said clip, and means for limiting the longitudinal movement of said bolt.

29. In a device of the character described, the combination, with a circular member and a demountable annular member surrounding the same, of a rotatable bolt carried by said circular member, a non-rotatable clip surrounding said bolt and having a portion adapted to engage said annular member, means for limiting the movement of said clip away from said circular member, a nut threaded upon said bolt and non-rotatably secured to said clip, means for limiting the longitudinal movement of said bolt, the threaded portion of said bolt being of such length as to become disengaged from said nut prior to the arrival of said clip at its point of greatest displacement, and an unthreaded extension carried by said bolt.

30. In a device of the character described, the combination, with a circular member, and a demountable annular member surrounding the same, of a rotatable bolt carried by said circular member, a non-rotatable clip surrounding said bolt and having a projecting portion adapted to engage said member, a nut threaded upon said bolt and non-rotatably secured to said clip, means for permitting the relative rocking of said nut and clip about an axis transverse to the radius of said circular member, and means for restricting the longitudinal movement of said bolt.

31. In a device of the character described, the combination, with a circular member and a demountable annular member surrounding the same, of a rotatable bolt carried by said circular member, a clip surrounding said bolt and having a portion adapted to engage said member, a second member surrounding said bolt and having universal pivotal movement with respect to said clip upon an axis transverse to the axis of said bolt, means for preventing relative rotation of said second member and clip about an axis coincident with the axis of said bolt, and means for limiting the longitudinal movement of said bolt.

32. In a device for securing a removable member to a wheel, the combination, with a bolt projecting laterally from said wheel, and a member rotatably secured upon said bolt, of a clip for engaging said removable member non-rotatably secured to said member and having rocking engagement therewith about an axis transverse to the radius of the wheel.

33. In a vehicle wheel, the combination with a felly and a felly band surrounding the same, said felly band having an outwardly projecting abutment at its forward edge, of a discontinuous ring surrounding said felly band and resting against said abutment, the outer portion of said ring being inwardly inclined, a second ring surrounding said felly band adjacent its opposite edge and having its outer portion inclined oppositely to said first ring, a demountable rim surrounding said felly band and having a lateral portion thereof seated on each of said rings, a bolt traversing said felly and having at its inner end a member engaging said second ring, and means for operating said bolt from its forward end to draw said second ring toward said first ring.

34. In a vehicle wheel, the combination with a felly and a felly band surrounding the same, said felly band having at its forward edge an outwardly projecting flange, of a discontinuous ring surrounding said felly band and resting against said abutment, the outer portion of said ring being inwardly inclined, a second ring surrounding said felly band adjacent its opposite edge and having its outer portion inclined oppositely to said first ring, a demountable rim surrounding said felly band and having a lateral portion thereof seated on each of said rings, and means for drawing said second ring toward said first ring.

35. The combination with a vehicle wheel provided with a felly; of a band on said felly, a split-ring on said band, means for preventing outward lateral movement of said split-ring though permitting radial removal thereof, a ring slidably held in permanent connection with said band, and a demountable rim held between said split-ring and said ring.

36. The combination with a vehicle wheel provided with a felly; a band on said felly having an outwardly directed flange at one edge, a split-ring held by said flange and adapted to be sprung thereover, a ring slidably held in permanent connection with said band, and a demountable rim held between said split-ring and said ring.

In testimony whereof, I hereunto affix my signature in the presence of two witnesses.

RICHARD S. BRYANT.

Witnesses:
 BRENNAN B. WEST,
 J. B. HULL.